(12) United States Patent
Zhang et al.

(10) Patent No.: US 11,522,168 B2
(45) Date of Patent: Dec. 6, 2022

(54) NEGATIVE ELECTRODE SHEET, PREPARATION METHOD THEREOF AND LITHIUM ION BATTERY CONTAINING THE SAME

(71) Applicant: Zhuhai CosMX Battery Co., Ltd., Zhuhai (CN)

(72) Inventors: Baohai Zhang, Zhuhai (CN); Chong Peng, Zhuhai (CN); Wei He, Zhuhai (CN); Chao Shi, Zhuhai (CN); Junyi Li, Zhuhai (CN); Yanming Xu, Zhuhai (CN)

(73) Assignee: ZHUHAI COSMX BATTERY CO., LTD.

( * ) Notice: Subject to any disclaimer, the term of this patent is extended or adjusted under 35 U.S.C. 154(b) by 179 days.

(21) Appl. No.: 17/119,304

(22) Filed: Dec. 11, 2020

(65) Prior Publication Data
US 2021/0351392 A1    Nov. 11, 2021

(30) Foreign Application Priority Data
May 8, 2020    (CN) .......................... 202010383944.7

(51) Int. Cl.
*H01M 4/36*    (2006.01)
*H01M 4/04*    (2006.01)
(Continued)

(52) U.S. Cl.
CPC ......... *H01M 4/0404* (2013.01); *H01M 4/366* (2013.01); *H01M 10/0525* (2013.01); *H01M 2004/027* (2013.01)

(58) Field of Classification Search
CPC ....... H01M 2004/027; H01M 10/0431; H01M 10/0587
See application file for complete search history.

(56) References Cited

U.S. PATENT DOCUMENTS

| 2014/0141303 | A1  | 5/2014  | Matsushita et al. |
| 2018/0287145 | A1* | 10/2018 | Lee ........................ H01M 4/133 |
| 2019/0305356 | A1* | 10/2019 | Chang .................... H01M 10/04 |

FOREIGN PATENT DOCUMENTS

| CN | 102362375 A | 2/2012 |
| CN | 103579666 A | 2/2014 |
(Continued)

OTHER PUBLICATIONS

First Office Action of Chinese Application No. 202010383944.7, dated Feb. 3, 2021, 6 pages.
(Continued)

*Primary Examiner* — Austin Murata
(74) *Attorney, Agent, or Firm* — Dilworth IP, LLC

(57) ABSTRACT

The present disclosure provides a negative electrode sheet, a preparation method thereof and a lithium ion battery containing the same. The negative electrode sheet includes a negative electrode current collector, where the negative electrode current collector includes a single-sided coating area and a double-sided coating area; in the double-sided coating area, second coating layers are disposed on both side surfaces of the negative electrode current collector, respectively, wherein each of the second coating layers includes a first negative electrode active material layer and a second negative electrode active material layer, the second negative electrode active material layer is disposed on a surface of the negative electrode current collector, and the first negative electrode active material layer is disposed on a surface of the second negative electrode active material layer.

20 Claims, 1 Drawing Sheet

(51) Int. Cl.
   *H01M 10/0525*   (2010.01)
   *H01M 4/02*      (2006.01)

(56) References Cited

FOREIGN PATENT DOCUMENTS

| | | |
|---|---|---|
| CN | 205828572 U | 12/2016 |
| CN | 106848325 A | 6/2017 |
| CN | 109244362 A | 1/2019 |
| CN | 109983609 A | 7/2019 |
| CN | 110534701 A | 12/2019 |
| CN | 110581254 A | 12/2019 |
| CN | 209843876 U | 12/2019 |
| CN | 111029527 A | 4/2020 |
| JP | 2020009049 A | 1/2020 |
| KR | 20200030835 A | 3/2020 |
| WO | 2019239988 A1 | 12/2019 |

OTHER PUBLICATIONS

Jiang et al, Mechanical Properties of Li-ion Battery Negative Plates and Factors Influencing Them, vol. 41, No. 2, Mar. 2019, pp. 43-48.
European Search Report in EP Patent Application No. 20214605.6 dated May 20, 2021.
Notice of Allowance in CN Patent Application No. 202010383944.7 dated May 26, 2021.

* cited by examiner

NEGATIVE ELECTRODE SHEET, PREPARATION METHOD THEREOF AND LITHIUM ION BATTERY CONTAINING THE SAME

CROSS-REFERENCE TO RELATED APPLICATION

This application claims priority to Chinese Patent Application No. 202010383944.7, filed on May 8, 2020, which is hereby incorporated by reference in its entirety.

TECHNICAL FIELD

The present disclosure belongs to the technical field of lithium ion batteries, and specifically relates to a negative electrode sheet, a preparation method thereof and a lithium ion battery containing the same.

BACKGROUND

With the rapid development of modern society, the applications of portable electronic devices (mobile phones, computers, etc.) have become increasingly widespread. Lithium ion battery is widely used in portable mobile electronic device terminals because of its relatively long circulation life and higher power density. However, as people's life rhythm become faster, people raise higher requirement on endurance capability and charging speed thereof. At present, it seems that fast-charging lithium ion battery has becoming the main developing trend of consumer lithium ion battery. However, the development of the fast-charging lithium ion battery has brought safety problems while bringing convenience to people. When lithium ion battery are in long circulation in the condition of high rate fast-charging, the negative electrode of lithium ion battery is prone to lithium deposition, especially on a single-sided coating area of the negative electrode. Consequently, the problems of battery capacity circulation plunging, inflating and air-swelling are caused, which greatly reduce the service life of the lithium ion battery.

SUMMARY

In order to improve the deficiency of the prior art, the present application provides a negative electrode sheet, a preparation method thereof and a lithium ion battery containing the same. The negative electrode sheet is mainly used to solve the problem of lithium deposition of a single-sided coating area of a negative electrode of a winding structural battery cell under high rate fast-charging scheme in a long circulation process.

The inventor of the present application found out in research that, a fundamental reason for the lithium deposition of the single-sided coating area of the negative electrode of the existing winding structural battery cell is because the single-sided coating area is close to a tab, which result in high current density, low potential, and insufficiency of the negative electrode dynamic property. The key to solving the lithium deposition of the single-sided coating area of the negative electrode, under the premise that charging scheme is unchanged, is to increase the dynamics of the negative electrode and/or reduce the dynamics of the a positive electrode. However, the increase of the overall negative electrode dynamic property will inevitably lead to the decrease of the power density of the lithium ion battery. The present disclosure provides a negative electrode sheet with specific structure, which, by adjusting dynamic property of active material of a single-sided coating area of a negative electrode of a winding lithium ion battery and dynamic properties of the active material on the overall negative electrode surface, increases the dynamic property of the single-sided coating area of the negative electrode of the lithium ion battery, decreases the polarization of the single-sided coating area of the negative electrode and the overall negative electrode surface, effectively improve the problem of the lithium deposition of the single-sided coating area of the negative electrode of the regular the winding structural lithium ion battery without reducing the battery energy density, increases the circulation lifetime of the lithium ion battery, improve the circulation inflation, and improve the fast-charging performance of the battery without reducing the battery energy density. The negative electrode sheet can resolve the problem of the lithium deposition of the single-sided coating area of the negative electrode of the winding structural battery cell under the high rate charging scheme in the long circulation process without reducing the energy density.

The purpose of the present disclosure is achieved through the following technical solutions:

a winding negative electrode sheet, specifically a winding negative electrode sheet for using in a lithium ion battery, the negative electrode sheet includes a negative electrode current collector, where the negative electrode current collector includes a single-sided coating area and a double-sided coating area;

in the single-sided coating area, a first coating layer is disposed on a side surface of the negative electrode current collector and includes a first negative electrode active material layer;

in the double-sided coating area, second coating layers are disposed on both side surfaces of the negative electrode current collector, respectively, where each of the second coating layers includes a first negative electrode active material layer and a second negative electrode active material layer, the second negative electrode active material layer is disposed on a surface of the negative electrode current collector, and the first negative electrode active material layer is disposed on a surface of the second negative electrode active material layer;

the first negative electrode active material layer includes a first negative electrode active material, the second negative electrode active material layer includes a second negative electrode active material, and a reception speed of lithium ions of the first negative electrode active material is greater than a reception speed of lithium ions of the second negative electrode active material.

In the present disclosure, a dynamic property of the first negative electrode active material layer is better than a dynamic property of the second negative electrode active material layer.

In the present disclosure, the single-sided coating area refers to coating a negative electrode active material layer to one of the two side surfaces of the current collector. The double-sided coating area refers to coating negative electrode active material layers to both sides of the current collector.

According to the present disclosure, the dynamic property refers a de-intercalation speed of the lithium ions, the faster the de-intercalation speed, the better the dynamic property. A factor affecting the de-intercalation speed mainly includes: (1) a supportable charging current of the active material, the larger the supportable charging current, the better the dynamic property; (2) a reception amount of lithium ions per unit time, that is, a reception speed of the lithium ions, the faster the reception speed of the lithium ions, the better the dynamic property.

Exemplarily, a de-intercalation speed of the lithium ions of the first negative electrode active material layer is greater than a de-intercalation speed of the lithium ions of the second negative electrode active material layer.

Exemplarily, a supportable charging current of the first negative electrode active material layer is larger than a supportable charging current of the second negative electrode active material layer.

Exemplarily, a reception speed of the lithium ions of the first negative electrode active material layer is larger than a reception speed of the lithium ions of the second negative electrode active material layer.

According to the present disclosure, a particle size distribution of the first negative electrode active material forming the first negative electrode active material layer is: 3 µm<$D_{10}$<4 µm, 5 µm<$D_{50}$<8 µm, 10 µm<$D_{90}$<13 µm; a particle size distribution of the second negative electrode active material forming the second negative electrode active material layer is: 5 µm<$D_{10}$<8 µm, 11 µm<$D_{50}$<14 µm, 20 µm<$D_{90}$<25 µm.

According to the present disclosure, a particle size of the first negative electrode active material forming the first negative electrode active material layer is less than a particle size of the second negative electrode active material forming the second negative electrode active material layer. The shorter the diffusion path of lithium ions in a negative electrode active material, the better the dynamic property. Therefore, this selection can ensure that the dynamic property of the first negative electrode active material layer is better than the dynamic property of the second negative electrode active material layer.

According to the present disclosure, the negative electrode current collector includes a tab area, a single-sided coating area and a double-sided coating area that are sequentially disposed; in the tab area, no coating layer is disposed on both sides of the negative electrode current collector.

According to the present disclosure, the tab area, the single-sided coating area and double-sided coating area are sequentially disposed in connection, that is, there is no blank area in the tab area, the single-sided coating area and double-sided coating area.

According to the present disclosure, the first negative electrode active material layer of the first coating layer is connected to the first negative electrode active material layer of the second coating layer.

According to the present disclosure, a thickness of the first coating layer and thicknesses of the second coating layers are the same.

According to the present disclosure, in the double-sided coating area, thicknesses of the second coating layers on both sides of the negative electrode current collector are the same.

According to the present disclosure, a length and a width of the current collector are not specifically defined, and current collectors with different lengths and different widths are selected according to the battery cell needed. Exemplarily, for a battery of model 386283, a length of a current collector is 500-1000 mm, such as 885±2 mm, and a width of the current collector is 400-900 mm, such as 773±2 mm.

According to the present disclosure, a length of the tab area, a length of the single-sided coating area, a length of the double-sided coating area are not specifically defined, and can be set according to different requirements. For example, the length of the double-sided coating area is longer than the length of the single-sided coating area, and the length of the double-sided coating area is longer than the length of the tab area. For another example, for a battery of model 386283, a length of a single-sided coating area is 113±2 mm.

According to the present disclosure, the tab area is disposed with a negative electrode tab, so that there is no need to dispose a coating layer.

According to the present disclosure, a distance between the negative electrode tab disposed in the tab area and the single-sided coating area is not particularly specified, for example, 10-100 mm; for another example, for a battery of model 386283, a distance between a negative electrode tab disposed in a tab area and a single-sided coating area is 35.5±0.5 mm.

According to the present disclosure, in the double-sided coating area, thicknesses of the second coating layers on both sides of the negative electrode current collector are the same.

According to the present disclosure, in the second coating layers, a thickness of the first negative electrode active material layer is 5-30 µm, such as 5 µm, 10 µm, 15 µm, 20 µm, 25 µm or 30 µm; a thickness of the second negative electrode active material layer is 90-115 µm, such as 90 µm, 95 µm, 100 µm, 105 µm, 110 µm or 115 µm; and a sum of the thickness of the first negative electrode active material layer and the thickness of the second negative electrode active material layer is 95-120 µm.

According to the present disclosure, in the single-sided coating area, a thickness of the first coating layer, that is, the thickness of the first negative electrode active material is less or equal than 120 µm, such as 95 µm, 100 µm, 105 µm, 110 µm or 115 µm.

According to the present disclosure, the negative electrode current collector optionally further includes a blank area, the blank area is disposed on the other side of the double-sided coating area which is connected to the single-sided coating area, the blank area is generated, for example, in order to avoid cutting an active material layer of a surface of the negative electrode current collector during a production process of the negative electrode sheet, a length of the blank area may be, for example, 0.5-2 mm, such as 1 mm.

According to the present disclosure, as shown in FIG. 1, the negative electrode current collector, starting from an end thereof and along a length direction of the negative electrode current collector, includes a tab area, a single-sided coating area and a double-sided coating area that are disposed sequentially;

in the single-sided coating area, namely BC section area in surface M, the first coating layer including the first negative electrode active material layer is coated on a side surface of the negative electrode current collector; in the double-sided coating area, namely AB section area of the surface M and the ED section area of surface N, the second coating layers each including the first negative electrode active material layer and the second negative electrode active material layer are coated on both side surfaces of the negative electrode current collector, and the second negative electrode active material layer is coated on a surface of the negative electrode current collector, the first negative electrode active material layer is coated on a surface of the second negative electrode active material layer;

in a preparation process of the negative electrode sheet having the above-mentioned structure, a preparation of the surface M may be that, for example, a slurry forming the first negative electrode active material layer and a slurry forming the second negative electrode active material layer are coated altogether from end A of the negative electrode current collector, where the slurry forming the second negative electrode active material layer is close to the negative electrode current collector, the slurry forming the first negative electrode active material layer is away from the negative electrode current collector; the coating of the slurry forming the second negative electrode active material layer is ended at end B, the coating of the slurry forming the first negative electrode active material layer is kept and ended at end C to ensure that the thickness of the first coating layer of the single-sided coating area and the thicknesses of the second coating layers of the double-sided coating area are the same.

In the preparation process of the negative electrode sheet having the above structure, a preparation of the surface N may be that, for example, the slurry forming the first negative electrode active material layer and the slurry forming the second negative electrode active material layer are coated altogether from end E of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end D, or, the slurry forming the first negative electrode active material layer and the slurry forming the second negative electrode active material layer are coated altogether from end D of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end E; a line connecting end E and end A is perpendicular to the negative electrode current collector, in actual preparation process, there is a misalignment of about 0-1 mm between end E and end A, a line connecting end D and end B is perpendicular to the negative electrode current collector, in actual preparation process, there is a misalignment of about 0-1 mm between end D and end B, to ensure that of the tab area, the single-sided coating area and the double-sided coating area are formed in the negative electrode sheet.

According to the present disclosure, the first negative electrode active material layer includes the first negative electrode active material, a first conductive agent and a first adhesive agent, the second negative electrode active material layer includes the second negative electrode active material, a second conductive agent and a second adhesive agent. The first negative electrode active material and the second negative electrode active material respectively forming the first negative electrode active material layer and the second negative electrode active material layer are the same or different, the first conductive agent and the second conductive agent are the same or different, and the first adhesive agent and the second adhesive agent are the same or different.

According to the present disclosure, a mass percentage of each component in the first negative electrode active material layer is:

70-99 wt % of the first negative electrode active material, 0.5-15 wt % of the first conductive agent, and 0.5-15 wt % of the first adhesive agent; where a particle size distribution of the first negative electrode active material is: 3 μm<$D_{10}$<4 μm, 5 μm<$D_{50}$<8 μm, and 10 μm<$D_{90}$<13 μm.

Preferably, the mass percentage of each component in the first negative electrode active material layer is:

80-98 wt % of the first negative electrode active material, 1-10 wt % of the first conductive agent, and 1-10 wt % of the first adhesive agent.

According to the present disclosure, a mass percentage of each component in the second negative electrode active material layer is:

70-99 wt % of the second negative electrode active material, 0.5-15 wt % of the second conductive agent, and 0.5-15 wt % of the second adhesive agent; where a particle size distribution of the second negative electrode active material is: 5 μm<$D_{10}$<8 μm, 11 μm<$D_{50}$<14 μm, and 20 μm<$D_{90}$<25 μm.

Preferably, the mass percentage of each component in the second negative electrode active material layer is:

80-98 wt % of the second negative electrode active material, 1-10 wt % of the second conductive agent, and 1-10 wt % of the second adhesive agent.

The first conductive agent and the second conductive agent are the same or different, and are independently selected from at least one of conductive carbon black, acetylene black, Ketjen black, conductive graphite, conductive carbon fiber, carbon nanotube, metal powder, and carbon fiber.

The first adhesive agent and the second adhesive agent are the same or different, and are independently selected from at least one of sodium carboxymethyl cellulose, styrene butadiene latex, polytetrafluoroethylene, and polyethylene oxide.

The first negative electrode active material and the second negative electrode active material are the same or different, and are independently selected from at least one of artificial graphite, natural graphite, mesocarbon microspheres, and lithium titanate; preferably, the particle size distribution of the first negative electrode active material is: 3 μm<$D_{10}$<4 μm, 5 μm<$D_{50}$<8 μm, 10 μm<$D_{90}$<13 μm; the particle size distribution of the second negative electrode active material is: 5 μm<$D_{10}$<8 μm, 11 μm<$D_{50}$<14 μm, 20 μm<$D_{90}$<25 μm; and the particle size distribution of the first negative electrode active material is larger than that of the second negative electrode active material.

The present disclosure further provides a preparation method of the above-mentioned negative electrode sheet, and the method includes the following steps:

1) preparing a slurry forming a first negative electrode active material layer and a slurry forming a second negative electrode active material layer, respectively;

2) using a double-layer coating machine to coat the slurry forming the first negative electrode active material layer and the slurry forming the second negative electrode active material layer on both side surfaces of a negative electrode current collector to prepare the negative electrode sheet.

According to the present disclosure, in step 1), a solid content of the slurry forming the first negative electrode active material layer and the slurry forming the second negative electrode active material layer is 40 wt % to 45 wt %.

According to the present disclosure, in step 2), on a side surface of the negative electrode current collector, the slurry forming the first negative electrode active material layer and the slurry forming the second negative electrode active material layer are coated altogether from end A of the negative electrode current collector, where the slurry forming the second negative electrode active material layer is close to the negative electrode current collector, the slurry forming the first negative electrode active material layer is away from the negative electrode current collector; the coating of the slurry forming the second negative electrode active material layer is ended at end B, the coating of the slurry forming the first negative electrode active material layer is kept and ended at end C, where an area between end A and end B is the double-sided coating area, an area between end B and end C is the single-sided coating area, the thickness of the first coating layer of the single-sided coating area and the thicknesses of the second coating layers of the double-sided coating area are the same.

According to the present disclosure, in step 2), on the other side surface of the negative electrode current collector, the slurry forming the first negative electrode active material layer and the slurry forming the second negative electrode active material layer are coated altogether from end E of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end D, or, the slurry forming the first negative electrode active material layer and the slurry forming the second negative electrode active material layer are coated altogether from end D of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end E; a line connecting end E and end A is perpendicular to the negative electrode current collector, in actual preparation process, there is a misalignment of about 0-1 mm between end E and end A, a line connecting end D and end B is perpendicular to the negative electrode current collector, in actual preparation process, there is a misalignment of about 0-1 mm between end D and end B, to ensure that of the tab area, the single-sided coating area and the double-sided coating area are formed in the negative electrode sheet.

The present disclosure further provides a lithium ion battery, including the above-mentioned negative electrode sheet.

According to the present disclosure, the battery further includes a positive electrode sheet and a separator.

The beneficial effects of the present disclosure are that:
the present disclosure provides a negative electrode sheet, a preparation method thereof and a lithium ion battery containing the same. The lithium ion battery containing the negative electrode sheet has the following effects:

(1) the problem of lithium deposition of a single-sided coating area of a negative electrode of a regular winding structural lithium ion battery can be effectively improved, thereby increasing a circulation lifetime of the lithium ion battery, and reducing a circulation inflation of the lithium ion battery;

(2) a compaction density of a negative electrode can be increased and an energy density of a battery cell can be increased; and (3) a dynamic property of the negative electrode and a fast-charging capacity of the battery can be improved.

DETAILED DESCRIPTION OF EMBODIMENTS

The present disclosure will be further described in detail with reference to specific embodiments hereinafter. It should be understood that the following embodiments are only illustratively explicating and explaining the present disclosure, and should not be interpreted as limiting the protection scope of the present disclosure. All technologies implemented based on the foregoing contents of the present disclosure fall within the scope intended to protect by the present disclosure.

The experiment methods used in the following embodiments are conventional methods unless otherwise specified; the reagents, materials, or the like, used in the following embodiments can be all obtained from commercial sources unless otherwise specified.

In the description of the present disclosure, it should be noted that the terms "first", "second", or the like, are only used for descriptive purpose, and do not indicate or imply relative importance.

The negative electrode sheet prepared in the following embodiments is used for a battery of model 386283, where a distance between a negative electrode tab disposed in a tab area and a single-sided coating area is 35.5±0.5 mm, and a length of the single-sided coating area is 113±2 mm, a length of a current collector is 885±2 mm, and a width of the current collector is 773±2 mm.

Embodiment 1

The first step: prepare a slurry forming a first negative electrode active material layer: add a first negative electrode active material (artificial graphite), a first conductive agent (conductive carbon black) and a first adhesive agent (sodium carboxymethyl cellulose) into a stirring tank according to a mass ratio of 97:1.5:1.5, add deionized water to prepare the slurry forming the first negative electrode active material layer, a solid content of the negative electrode slurry is 40 wt %~45 wt %; where a particle size distribution of the first negative electrode active material is: 3 μm<$D_{10}$<4 μm, 5 μm<$D_{50}$<8 μm, 10 μm<$D_{90}$<13 μm.

The second step: prepare a slurry forming a second negative electrode active material layer: add a second negative electrode active material (artificial graphite), a second conductive agent (conductive carbon black) and a second adhesive agent (sodium carboxymethyl cellulose) into a stirring tank according to a mass ratio of 97:1.5:1.5, add deionized water to prepare the slurry forming the second negative electrode active material layer, a solid content of the negative electrode slurry is 40 wt % to 45 wt %; where the particle size distribution of the second negative electrode active material is: 5 μm<$D_{10}$<8 μm, 11 μm<$D_{50}$<14 μm, 20 μm<$D_{90}$<2 5 μm.

Figure 1:
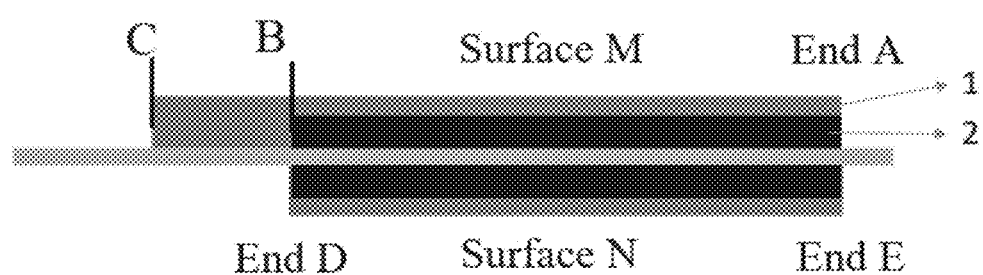
FIG. 1 is a structure of a negative electrode sheet according to a preferred embodiment of the present disclosure, where 1 is a first negative electrode active material layer, and 2 is a second negative electrode active material layer.
Figure 2:
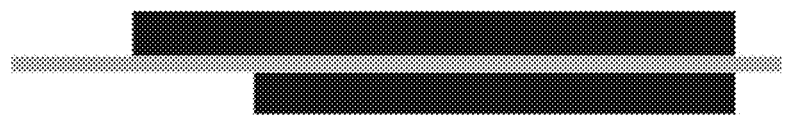
FIG. 2 is a structure of a regular negative electrode sheet.

The third step: use a double-layer coating machine to coat the slurry forming the first negative electrode active material layer and the slurry forming the second negative electrode active material layer on surfaces of the negative electrode current collector, specifically:

as shown in FIG. 1, on a side surface M of the negative electrode current collector, the slurry forming the first negative electrode active material layer and the slurry forming the second negative electrode active material layer are coated altogether from end A of the negative electrode current collector, where the slurry forming the second negative electrode active material layer is close to the negative electrode current collector, the slurry forming the first negative electrode active material layer is away from the negative electrode current collector; the coating of the slurry forming the second negative electrode active material layer is ended at end B, the coating of the slurry forming the first negative electrode active material layer is kept and ended at end C, where an area between end A and end B is the double-sided coating area, an area between end B and end C is the single-sided coating area, the thickness of the first coating layer of the single-sided coating area and the thicknesses of the second coating layers of the double-sided coating area are the same;

on the other side surface N of the negative electrode current collector, the slurry forming the first negative electrode active material layer and the slurry forming the second negative electrode active material layer are coated altogether from end E of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end D, or, the slurry forming the first negative electrode active material layer and the slurry forming the second negative electrode active material layer are coated altogether from end D of the negative electrode current collector, where the slurry forming the second negative electrode active material layer is close to the negative electrode current collector, the slurry forming the first negative electrode active material layer is away from the negative electrode current collector; and the coating of the slurry forming the second negative electrode active material layer is ended at end E; a line connecting end E and end A is perpendicular to the negative electrode current collector, a line connecting end D and end B is perpendicular to the negative electrode current collector, to ensure that of the tab area, the single-sided coating area and the double-sided coating area are formed in the negative electrode sheet; the prepared negative electrode sheet is dried at a temperature of 100° C.

The fourth step: prepare a positive electrode sheet: use lithium cobalt oxide as a positive electrode active material, and then add it along with a conductive agent (acetylene black) and an adhesive agent (polyvinylidene fluoride) into a stirring tank according to a mass ratio of 97.2:1.5:1.3, add NMP solvent, stir well, go through a 200-mesh screen to obtain a positive electrode slurry, where a solid content of the positive electrode slurry is 70 wt %~75 wt %, and then use a coating machine to coat the slurry on an aluminum foil, dry it at 120° C. to obtain the positive electrode sheet.

The fifth step: assemble a battery cell: wind the negative electrode sheet prepared in the first to third steps above, the positive electrode sheet prepared in the fourth step and a separator together to form a roll core, which is packaged with an aluminum plastic film, baked to remove moisture and then injected with electrolytic solution, and applied with a hot-press forming process to form the battery cell.

Embodiments 2-3 and Comparative Examples 1-2

The other operation steps are the same as Embodiment 1, the only difference lies in that the thickness of the single-sided coating area, and the thicknesses of the first negative electrode active material layer and the second negative electrode active material layer of the double-sided coating area are different, which is specifically shown in Table 1.

TABLE 1

Structural parameters of the negative electrode sheet of Embodiments 1-3 and Comparative Examples 1-2

| | Double-sided coating area | | |
| --- | --- | --- | --- |
| | The thickness of the first negative electrode active material layer | The thickness of the second negative electrode active material layer | Single-sided coating area |
| Embodiment 1 | 5 μm | 115 μm | First negative electrode active material layer 120 μm |
| Embodiment 2 | 15 μm | 105 μm | First negative electrode active material layer 120 μm |
| Embodiment 3 | 30 μm | 90 μm | First negative electrode active material layer 120 μm |
| Comparative Example 1 | 0 | 120 μm | First negative electrode active material layer 120 μm |
| Comparative Example 2 | 120 μm | 0 | First negative electrode active material layer 120 μm |

The negative electrode sheets prepared in the embodiments have the same compaction density, and assembled into a soft-packed battery cell of model 386283. An energy density is tested by charging and discharging with 0.2 C/0.2 C at 25° C., each of the prepared soft-packed battery cell is charged with 2.5 C or discharged with 0.7 C at 25° C., and the battery is disassembled under different circulation counts to confirm a lithium deposition of the single-sided coating area of the negative electrode of the battery and the negative electrode surface. The disassembling result and energy density are shown in Table 2 below.

TABLE 2

The energy density of the battery and the lithium deposition, capacity retention rate and inflation data of the single-sided coating area of the negative electrode during a cycling process of the embodiments

| Items | Energy Density Wh/L | Lithium Deposition | | | | | | 1000 T Capacity Retention Rate | 1000 T Inflation |
|---|---|---|---|---|---|---|---|---|---|
| | | 300 T Single-sided coating area | 500 T Single-sided coating area | 1000 T Single-sided coating area | 300 T Negative Electrode Surface | 500 T Negative Electrode Surface | 1000 T Negative Electrode Surface | | |
| Embodiment 1 | 693 | No Lithium Deposition | No Lithium Deposition | No Lithium Deposition | No Lithium Deposition | No Lithium Deposition | Slight Lithium Deposition | 83.01% | 9.85% |
| Embodiment 2 | 692 | No Lithium Deposition | No Lithium Deposition | No Lithium Deposition | No Lithium Deposition | No Lithium Deposition | No Lithium Deposition | 84.32% | 9.63% |
| Embodiment 3 | 689 | No Lithium Deposition | No Lithium Deposition | No Lithium Deposition | No Lithium Deposition | No Lithium Deposition | No Lithium Deposition | 86.09% | 9.01% |
| Comparative Example 1 | 690 | Slight Lithium Deposition | Lithium Deposition | Severe Lithium Deposition | No Lithium Deposition | Slight Lithium Deposition | Lithium Deposition | 80.23% | 11.15% |
| Comparative Example 2 | 675 | No Lithium Deposition | No Lithium Deposition | No Lithium Deposition | No Lithium Deposition | No Lithium Deposition | No Lithium Deposition | 87.35% | 8.95% |

In Table 2, the single-sided coating area has slight lithium deposition indicates that the single-sided coating area has a lithium deposition area takes up less than 10% of a total area of the single-sided coating area; the single-sided coating area has lithium deposition indicates that the lithium deposition area of the single-sided coating area takes up 10%-30% of the total area of the single-sided coating area; the single-sided coating area has severe lithium deposition indicates that the lithium deposition area of the single-sided coating area takes up greater than 50% of the total area of the single-sided coating area;

the negative electrode surface has slight lithium deposition indicates that a lithium deposition area takes up less than 10% of a total area of the negative electrode; the negative electrode surface has lithium deposition indicates that the lithium deposition area takes up 10% to 30% of the total area of the negative electrode; the negative electrode surface has severe lithium deposition indicates that lithium deposition area takes up more than 50% of the total area of the negative electrode.

It can be seen from Table 2 that the battery cell prepared using the method of the present disclosure can effectively improve the problem of lithium deposition of the single-sided coating area of the negative electrode of the conventional winding structural lithium ion battery without reducing the energy density of the battery, improve the circulation lifetime of the lithium ion battery, improve the circulation inflation, and improve the fast-charging performance of the lithium-ion battery. Although mere use of a negative electrode active material with better dynamic property and smaller particle size can effectively improve the problem of lithium deposition of the single-sided coating area of the negative electrode during long circulation process, it greatly reduces its energy density.

The implementations of the present disclosure have been illustrated above. However, the present disclosure is not limited to the above-mentioned implementations. Any modification, equivalent replacement, improvement, or the like, made within the spirit and the principle of the present disclosure shall fall within the protection scope of the present disclosure.

What is claimed is:

1. A winding negative electrode sheet, comprising a negative electrode current collector, wherein the negative electrode current collector comprises a single-sided coating area and a double-sided coating area;
    in the single-sided coating area, a first coating layer is disposed on a side surface of the negative electrode current collector and comprises a first negative electrode active material layer;
    in the double-sided coating area, second coating layers are disposed on both side surfaces of the negative electrode current collector, respectively, wherein each of the second coating layers comprises a first negative electrode active material layer and a second negative electrode active material layer, the second negative electrode active material layer is disposed on a surface of the negative electrode current collector, and the first negative electrode active material layer is disposed on a surface of the second negative electrode active material layer;
    the first negative electrode active material layer comprises a first negative electrode active material, the second negative electrode active material layer comprises a second negative electrode active material, and a reception speed of lithium ions of the first negative electrode active material is greater than a reception speed of lithium ions of the second negative electrode active material.

2. The negative electrode sheet according to claim 1, wherein a particle size distribution of the first negative electrode active material forming the first negative electrode active material layer is: 3 μm<$D_{10}$<4 μm, 5 μm<$D_{50}$<8 μm, 10 μm<$D_{90}$<13 μm; a particle size distribution of the second negative electrode active material forming the second negative electrode active material layer is: 5 μm<$D_{10}$<8 μm, 11 μm<$D_{50}$<14 μm, 20 μm<$D_{90}$<25 μm.

3. The negative electrode sheet according to claim 1, wherein the first negative electrode active material layer of the first coating layer is connected to the first negative electrode active material layer of the second coating layer.

4. The negative electrode sheet according to claim 2, wherein the first negative electrode active material layer of the first coating layer is connected to the first negative electrode active material layer of the second coating layer.

5. The negative electrode sheet according to claim 1, wherein a thickness of the first coating layer and thicknesses of the second coating layers are the same.

6. The negative electrode sheet according to claim 2, wherein a thickness of the first coating layer and thicknesses of the second coating layers are the same.

7. The negative electrode sheet according to claim 3, wherein a thickness of the first coating layer and thicknesses of the second coating layers are the same.

8. The negative electrode sheet according to claim 1, wherein in the double-sided coating area, thicknesses of the second coating layers on both sides of the negative electrode current collector are the same.

9. The negative electrode sheet according to claim 2, wherein in the double-sided coating area, thicknesses of the second coating layers on both sides of the negative electrode current collector are the same.

10. The negative electrode sheet according to claim 3, wherein in the double-sided coating area, thicknesses of the second coating layers on both sides of the negative electrode current collector are the same.

11. The negative electrode sheet according to claim 1, wherein in the second coating layers, a thickness of the first negative electrode active material layer is 5-30 μm, a thickness of the second negative electrode active material layer is 90-115 μm; and a sum of the thickness of the first negative electrode active material layer and the thickness of the second negative electrode active material layer is 95-120 μm.

12. The negative electrode sheet according to claim 2, wherein in the second coating layers, a thickness of the first negative electrode active material layer is 5-30 μm, a thickness of the second negative electrode active material layer is 90-115 μm; and a sum of the thickness of the first negative electrode active material layer and the thickness of the second negative electrode active material layer is 95-120 μm.

13. The negative electrode sheet according to claim 3, wherein in the second coating layers, a thickness of the first negative electrode active material layer is 5-30 μm, a thickness of the second negative electrode active material layer is 90-115 μm; and a sum of the thickness of the first negative electrode active material layer and the thickness of the second negative electrode active material layer is 95-120 μm.

14. The negative electrode sheet according to claim 1, wherein the first negative electrode active material layer further comprises a first conductive agent and a first adhesive agent;
a mass percentage of each component in the first negative electrode active material layer is:
70-99 wt % of the first negative electrode active material, 0.5-15 wt % of the first conductive agent, and 0.5-15 wt % of the first adhesive agent;
wherein, a particle size distribution of the first negative electrode active material is: 3 μm<$D_{10}$<4 μm, 5 μm<$D_{50}$<8 μm, and 10 μm<$D_{90}$<13 μm.

15. The negative electrode sheet according to claim 2, wherein the first negative electrode active material layer further comprises a first conductive agent and a first adhesive agent;
a mass percentage of each component in the first negative electrode active material layer is:
70-99 wt % of the first negative electrode active material, 0.5-15 wt % of the first conductive agent, and 0.5-15 wt % of the first adhesive agent;
wherein, a particle size distribution of the first negative electrode active material is: 3 μm<$D_{10}$<4 μm, 5 μm<$D_{50}$<8 μm, and 10 μm<$D_{90}$<13 μm.

16. The negative electrode sheet according to claim 3, wherein the first negative electrode active material layer further comprises a first conductive agent and a first adhesive agent;
a mass percentage of each component in the first negative electrode active material layer is:
70-99 wt % of the first negative electrode active material, 0.5-15 wt % of the first conductive agent, and 0.5-15 wt % of the first adhesive agent;
wherein, a particle size distribution of the first negative electrode active material is: 3 μm<$D_{10}$<4 μm, 5 μm<$D_{50}$<8 μm, and 10 μm<$D_{90}$<13 μm.

17. The negative electrode sheet according to claim 1, wherein the second negative electrode active material layer further comprises a second conductive agent and a second adhesive agent;
a mass percentage of each component in the second negative electrode active material layer is:
70-99 wt % of the second negative electrode active material, 0.5-15 wt % of the second conductive agent, and 0.5-15 wt % of the second adhesive agent;
wherein a particle size distribution of the second negative electrode active material is: 5 μm<$D_{10}$<8 μm, 11 μm<$D_{50}$<14 μm, and 20 μm<$D_{90}$<25 μm.

18. The negative electrode sheet according to claim 2, wherein the second negative electrode active material layer further comprises a second conductive agent and a second adhesive agent;
a mass percentage of each component in the second negative electrode active material layer is:
70-99 wt % of the second negative electrode active material, 0.5-15 wt % of the second conductive agent, and 0.5-15 wt % of the second adhesive agent;
wherein a particle size distribution of the second negative electrode active material is: 5 μm<$D_{10}$<8 μm, 11 μm<$D_{50}$<14 μm, and 20 μm<$D_{90}$<25 μm.

19. The negative electrode sheet according to claim 3, wherein the second negative electrode active material layer further comprises a second conductive agent and a second adhesive agent;
a mass percentage of each component in the second negative electrode active material layer is:
70-99 wt % of the second negative electrode active material, 0.5-15 wt % of the second conductive agent, and 0.5-15 wt % of the second adhesive agent;
wherein a particle size distribution of the second negative electrode active material is: 5 μm<$D_{10}$<8 μm, 11 μm<$D_{50}$<14 μm, and 20 μm<$D_{90}$<25 μm.

20. A lithium-ion battery, comprising the negative electrode sheet according to claim 1.

* * * * *